(12) United States Patent
Saraydar

(10) Patent No.: US 6,247,711 B1
(45) Date of Patent: Jun. 19, 2001

(54) SULKY WITH PIVOTABLE WHEELS

(76) Inventor: Michael Saraydar, 241 Irving Ave., Closter, NJ (US) 07624

( * ) Notice: Subject to any disclaimer, the term of this patent is extended or adjusted under 35 U.S.C. 154(b) by 0 days.

(21) Appl. No.: 09/267,001

(22) Filed: Mar. 12, 1999

(51) Int. Cl.$^7$ ................................................ B62C 1/00
(52) U.S. Cl. .............................................................. 280/64
(58) Field of Search ............................ 280/63, 64, 47.24, 280/47.25, 47.131; 301/126, 131, 132, 125, 124.1

(56) References Cited

U.S. PATENT DOCUMENTS

| 0,007,364 | 5/1850 | Dodge | 280/63 |
|---|---|---|---|
| 0,283,916 | 8/1883 | Newberry | 280/63 |
| 0,375,211 | 12/1887 | Smith and Janson | 280/63 |
| 491,491 | * 2/1893 | Pray | 280/63 |
| 502,984 | * 8/1893 | McIntosh | 280/63 |
| 0,562,702 | 6/1896 | Brockman | 280/63 |
| 1,273,593 | 7/1918 | Felicetti | 280/87.1 |
| 1,739,716 | 12/1929 | Fischer | 280/75 |
| 2,377,641 | * 6/1945 | Miner | 280/63 |
| 2,440,502 | 4/1948 | Etgen | 280/63 |
| 3,379,452 | 4/1968 | Torrisi | 280/63 |
| 3,847,408 | 11/1974 | King | 280/63 |
| 4,033,598 | * 7/1977 | King | 280/63 |
| 4,071,257 | 1/1978 | Discount | 280/63 |
| 4,078,829 | * 3/1978 | Davis | 280/657 |
| 4,095,815 | * 6/1978 | Mitchell | 280/63 |
| 4,465,291 | 8/1984 | Wylie et al. | 280/47.24 |
| 4,817,975 | 4/1989 | Saraydar | 280/63 |
| 4,869,556 | * 9/1989 | Gees | 301/124.1 |
| 5,057,812 | 10/1991 | Yukawa et al. | 338/66 |
| 5,062,652 | * 11/1991 | Burke | 280/64 |
| 6,095,535 | * 8/2000 | Steinat et al. | 280/63 |

FOREIGN PATENT DOCUMENTS

| 674652 | 11/1963 | (CA) | 280/63 |
|---|---|---|---|
| 561891 | 10/1923 | (FR) | 280/701 |
| 1364006 | 5/1964 | (FR) | 280/63 |
| 595871 | 7/1959 | (IT) | 280/696 |

* cited by examiner

Primary Examiner—Brian Johnson
Assistant Examiner—G B Klebe
(74) Attorney, Agent, or Firm—Sofer & Haroun, LLP

(57) ABSTRACT

A sulky that comprises an upper support having a seat attached thereto via a seat support member and further having at each end an outer frame member and an inner frame member; a pair of axles, each of which are disposed between one of the outer and the inner frame members, and onto which are rotatably mounted, via a wheel hub, a pair of wheels; a pair of shafts for harnessing the sulky to a horse, each of the shafts having a pivot connection along its length; and a pair of fork assemblies, each having a pair of forks which are joined at one end so as to be pivotably secured to the pivot connection along one of the shafts. The unjoined ends of the forks are rotatably connected to one of the axles on opposite sides of the wheel hub. The wheels are configured to pivot around said pivot connection upon the exertion of a sideways displacement force at the wheels. In one embodiment of the invention, each of the pair of axles is horizontally slidably secured to the outer and inner frame members. In another embodiment, each of the pair of axles is axially slidably secured to the outer and inner frame members. In still another embodiment, each of the pair of axles is horizontally and axially slidably secured to the outer and inner frame members via a ball joint, preferably mounted on a track disposed in the outer and inner frame members.

13 Claims, 7 Drawing Sheets

SULKY WITH PIVOTABLE WHEELS

FIELD OF THE INVENTION

This invention relates to harness racing, and more specifically to a pivotable sulky for use in harness racing.

BACKGROUND OF THE INVENTION

Horse racing is a sport that has enjoyed great popularity over the years. One variation of horse racing, also referred to as low-wheeled harness racing, typically employs specially trained horses which strive to pull rider-mounted sulkies around a race track of prescribed length in the shortest length of time possible.

Typically, a sulky is an apparatus that has two rotatable wheels that are fixedly mounted to a frame, a rear-mounted seat for a rider and at least one forward-mounted shaft that is harnessed to a horse. For instance, U.S. Pat. No. 3,847,408 discloses a single shaft sulky that has two wheels that are supported by axles at the outer ends of a flexible arch, a driver's seat secured to the arch, and a single flexible shaft that extends upwardly and forwardly from the arch to a single point connection on a horse's harness. The two wheels are fixedly mounted to the axles in that the centerline of the wheels' path is always perpendicular to the axis of the axle.

FIGS. 1 and 2 illustrate another sulky of the prior art, as shown in U.S. Pat. No. 4,817,975, which is incorporated herein by reference as fully as if set forth in its entirety. FIG. 1 is a side view that shows wheel 14 which rotates around center hub 30. The wheel assembly is rotatably mounted to U-shaped trailing arm 16 which has an upward-extending rod 18. Rod 18 is inserted and pivots in vertical tube 20, which extends downwardly from frame 12. Seat 22 is mounted to the frame via rearwardly-extending support bar 26, in an adjustable horizontal position that is approximately even with center hub 30 of the wheels and which is about thirty inches above the ground. A pair of forwardly-mounted shafts 28, adjustable to different widths and heights, extend from frame 12 so as to be harnessed to a horse. FIG. 2 is a top view that shows the same features as FIG. 1.

As is well known in the prior art, one of the primary problems experienced by most sulkies is their susceptibility to tipping. This problem is particularly acute when a sulky is travelling around curved sections of the racetrack. This, along with sudden lateral movements of the horse, irregularities in the racing surface or a slightly too aggressive manuever, among many other factors, can result in a vertical tipping force at one of the wheels. If the vertical tipping force is sufficiently large, the sulky may tip, causing the rider to fall from the seat and potentially into the path of oncoming horse-drawn sulkies. Thus, in addition to causing the race to be lost, a tipped sulky may place a rider in serious danger of injury.

Fixed-wheel sulkies of the prior art typically do not have features that prevent the sulky from tipping, but instead rely on the skill of the rider to manuever the apparatus and to regulate the speed of the horse so as to minimize the likelihood of tipping. On the other hand, U.S. Pat. No. 4,817,975 discloses a pivotable wheel feature meant to decrease the likelihood of tipping.

Another problem experienced by sulkies of the prior art is friction between various moving parts of the apparatus. For instance, prior art sulkies that have wheels that are fixedly mounted to an axle experience undesirable friction between the wheels and the axle, and between the wheels and the surface of the track, as the alternating gait of the horse produces alternating sideway displacement forces thereon. In addition, fixedly mounted wheels experience similar frictional forces caused by sideways displacement forces when the apparatus is pulled around the curved sections of the racetrack. Also, when the sulky is pulled around a curved racetrack, torsional stresses are experienced in the axle carrying the wheels, which restrict the movement of the horse.

These frictional and torsional stresses slow the speed of the sulky in numerous ways. First, they increase the resistance experienced by the wheels of the sulky as they rotate around their axles, thus slowing the rotation of the wheels. In addition, because of the increased likelihood of tipping, a rider is more likely to slow the horse down to avoid a dangerous spill. Also, the frictional forces may interfere with the rolling gait of the horse, causing the horse to misstep, or may cause the horse to tire prematurely.

Thus, there is a need for a sulky which decreases the likelihood of tipping while decreasing undesirable forces experienced by the sulky that slow its progress during a race.

SUMMARY OF THE INVENTION

The present invention, in accordance with one embodiment, relates to a sulky that comprises an upper support having at each end an outer frame member and an inner frame member. The sulky further comprises a pair of axles, each of which are disposed between one of the outer and the inner frame members, and onto which are rotatably mounted, via a wheel hub, a pair of wheels. The sulky also comprises a pair of shafts for harnessing the sulky to a horse. Each of the shafts has a pivot connection along its length. A pair of fork assemblies, each having a pair of forks which are joined at one end, is pivotably secured at the joined end to the pivot connection along one of the shafts. The unjoined ends of the forks are rotatably connected to one of the axles on opposite sides of the wheel hub. The wheels are configured to pivot around the pivot connection upon the exertion of a sideways displacement force at the wheels.

In one embodiment of the invention, each of the pair of axles is horizontally slidably secured to the outer and inner frame members. In another embodiment, each of the pair of axles is axially slidably secured to the outer and inner frame members. In still another embodiment, each of the pair of axles is horizontally and axially slidably secured to the outer and inner frame members via a ball joint, preferably mounted on a track disposed in the outer and inner frame members.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE INVENTION

Figure 3:
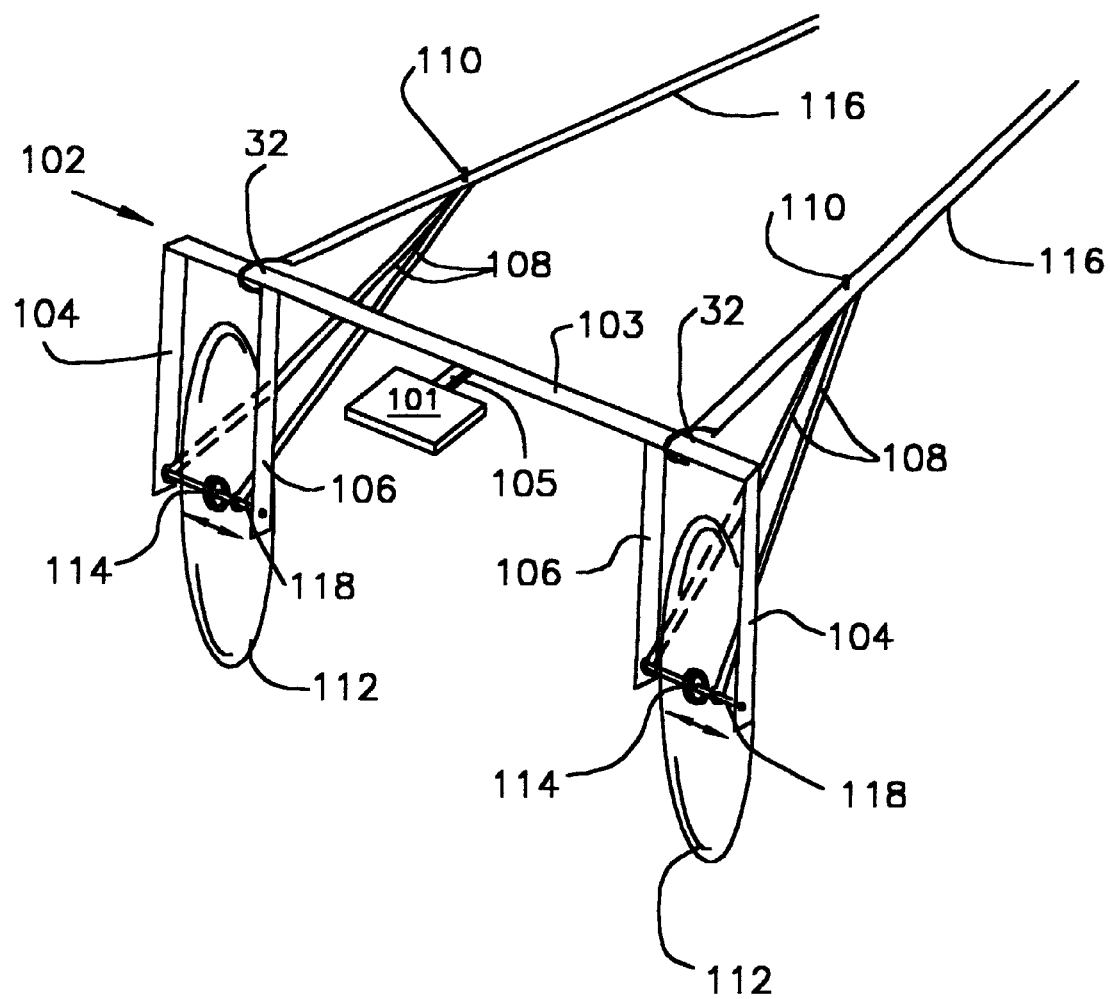
FIG. 3 is an isometric drawing that illustrates, according to one embodiment of the invention, the salient features of a sulky, according to one embodiment of the invention.

FIG. 3 is an isometric drawing that illustrates, according to one embodiment of the invention, the salient features of a sulky that decreases the likelihood of tipping while decreasing undesirable forces experienced by the sulky that slow its progress during a race. Main frame 102 comprises an upper support 103. Mounted to upper support 103 via seat support arm 105, and extending rearwardly, is driver seat 101. Extending downwardly at each end of upper support 103 is outer frame member 104 and inner frame member 106. The distance between outer frame member 104 and inner frame member 106 varies depending on the amount of lateral travel that is desired to be experienced by the wheels, as will be fully explained below.

Extending forward from upper support 103 is a pair of shafts 116, which are configured to be harnessed to the flanks of a horse. The manner by which pair of shafts 116 are harnessed to the flanks of a horse may be by strapping or tying the shafts to a hitch worn by the horse, or by any other means now known or later concieved. Similarly, the manner by which pair of shafts 116 are attached to upper support 103 may be by any means now known or later conceived, such as by adjustable collar 32 shown in FIG. 7, which will be discussed further below. Advantageously, pair of shafts 116 are adjustably attached to upper support 103 so as to permit the use of the sulky with a variety of different sized horses.

According to one embodiment, shafts 116 also comprise pivot connection 110, which extends vertically through the shaft. Pivot connection 110 is attached to one end of pivotable fork assembly 108, namely the end of the fork assembly at which the two forks are joined. It should be noted, however, that a pivot connection attached to a pivotable fork assembly and passing vertically through the shafts is merely one method of pivotably attaching pivotable fork assembly 108 to shafts 116, and that any means now known or later conceived of pivotably attaching fork assembly 108 to shafts 116 is within the contemplation of the inventor. Advantageously, pivot connection 110 is located on shafts 116 approximately 36 inches from where shafts 116 connect to upper support 103.

Each wheel 112 has disposed in its center wheel hub 114. Passing co-axially through each wheel hub 114 and fixedly attached thereto is axle 118, which extends between and is rotatably attached to outer frame members 104 and inner frame members 106. The means by which the ends of axles 118 attach to outer frame members 104 and inner frame members 106 will be further discussed below. The unjoined ends of the two forks of each pivotable fork assembly 108 attach to axle 118, such that one fork end is rotatably attached between a first axial end of wheel hub 114 and outer frame member 104 and such that the other fork end is rotatably attached between a second axial end of wheel hub 114 and inner frame member 106. Preferably, the ends of each fork are equipped with holes through which axle 118 passes.

Figure 4A:
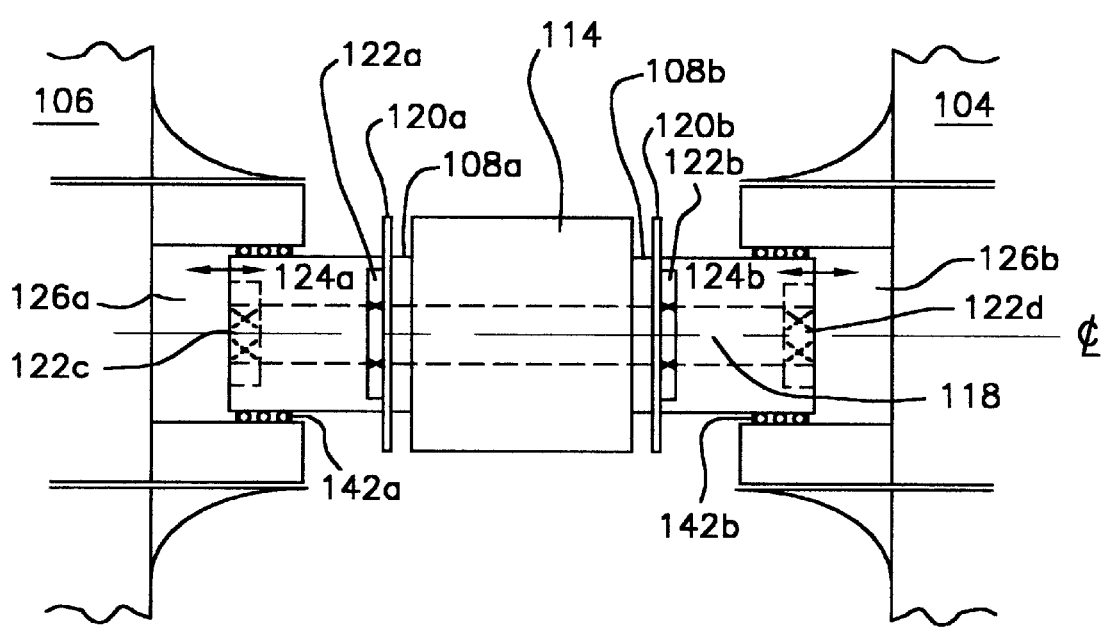
FIG. 4(a) is a rear view that illustrates the connection of the wheel assembly and axle to the outer and inner frame members, in accordance with one embodiment of the invention.

FIG. 4(a) is a rear view that illustrates, according to one embodiment of the present invention, the connection of the wheel assembly and axle 118 to outer and inner frame members 104 and 106. As shown, axle 118 is axially disposed through wheel hub 114. First fork 108a of fork assembly 108 is rotatably attached to axle 118 at one end of hub 114 and second fork 108b of pivotable fork assembly 108 is rotatably attached to axle 118 at the other end of hub 114. According to one embodiment, axle 118 is threaded, and forks 108a and 108b are kept in a position proximate the ends of hub 114 by washers 120a and 120b, which are in turn secured by nuts 122a and 122b, respectively. Nuts 122c and 122d are disposed on the ends of axle 118 so as to secure thereto a pair of male couplings, which are explained below.

According to one embodiment, disposed on opposite sides of each wheel are male couplings 124a and 124b, which are configured and sized so as to travel axially within female couplings 126a and 126b disposed in inner frame member 104 and outer frame member 106, respectively. Male couplings 124a and 124b travel axially in and out of female couplings 126a and 126b in accordance with the lateral movement of the wheel. For instance, if male coupling 124a is inserted into female coupling 126a due to a leftward displacement force experienced by the wheel (thus causing the wheel to pivot laterally to the left), male coupling 124b is withdrawn from female coupling 126b. Likewise, if male coupling 124b is inserted into female coupling 126b due to a rightward displacement force experienced by the wheel (thus causing the wheel to pivot laterally to the right), male coupling 124a is withdrawn from female coupling 126a. Washers 120a and 120b are preferably sized larger than the outer diameter of the male couplings so as to act as stops that prevent either male coupling from pulling out of its corresponding female coupling. According to one embodiment, sets of ball bearings 142a and 142b are disposed between male couplings 124a and 124b and female couplings 126a and 126b, so as to provide support and to reduce the friction between the couplings.

Figure 4B:
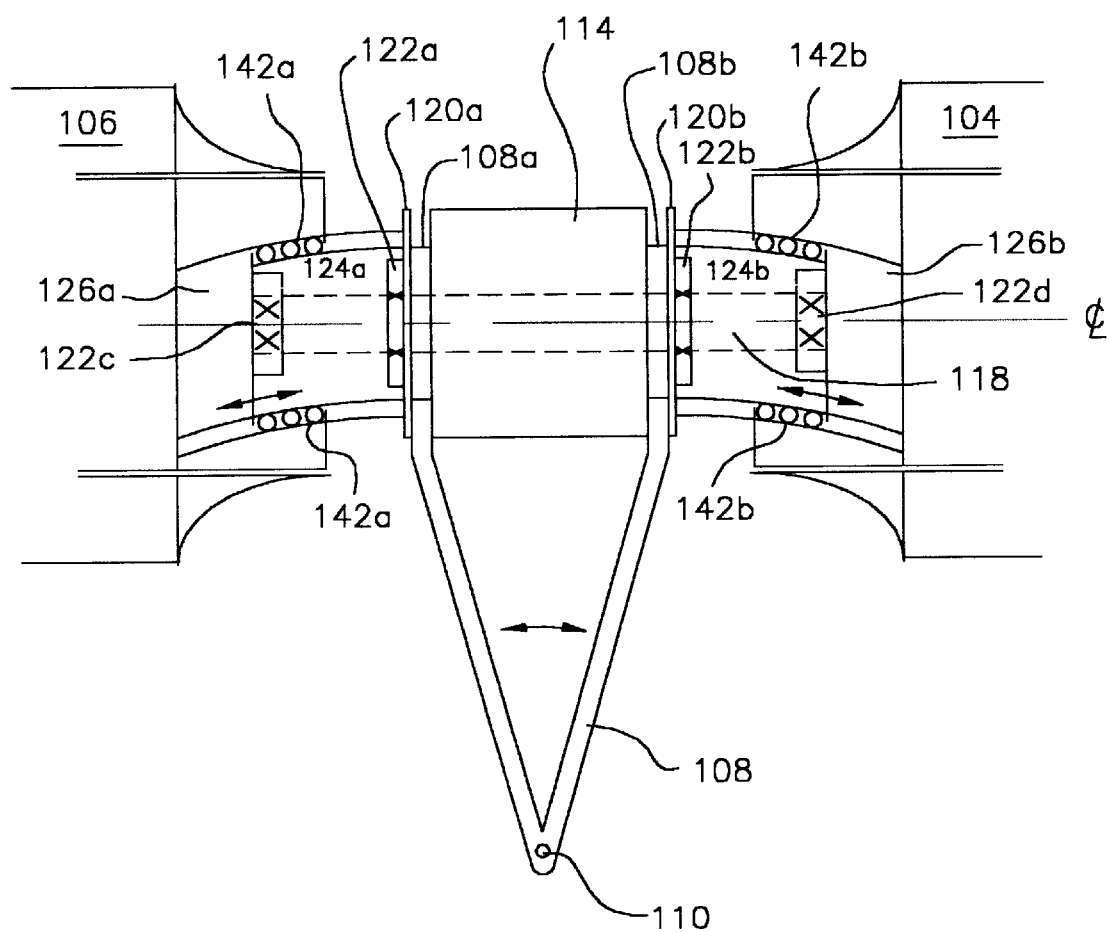
FIG. 4(b) is a top view that illustrates male and female couplings having curved surfaces, in accordance with a preferred embodiment of the invention.

FIG. 4(b) is a top view that illustrates, according to a preferred embodiment of the present invention, the connection of the wheel assembly and axle 118 to outer and inner frame members 104 and 106. In this embodiment, disposed on opposite sides of each wheel are male couplings 124a and 124b, which are curved by a radius that corresponds to the radial distance between the center of the wheel and pivot connection 110. As the wheel pivots around pivot connection 110, male couplings 124a and 124b travel axially in a curved path and engage the similarly curved surfaces of female couplings 126a and 126b disposed in inner frame member 104 and outer frame member 106, respectively. Advantageously, the radius of curvature of male couplings 124a and 124b, and of female couplings 126 and 126b, is equal to the radial distance between the center of the wheel and pivot connection 110. Preferably, the radius of curvature of the couplings, and the radial distance between the center of the wheel and pivot connection, are approximately 36 inches. As previously discussed, in a preferred embodiment, ball bearings 142a and 142b are disposed between male couplings 124a and 124b and female couplings 126a and 126b, so as to provide support and to reduce the friction between the couplings.

Figure 4C:
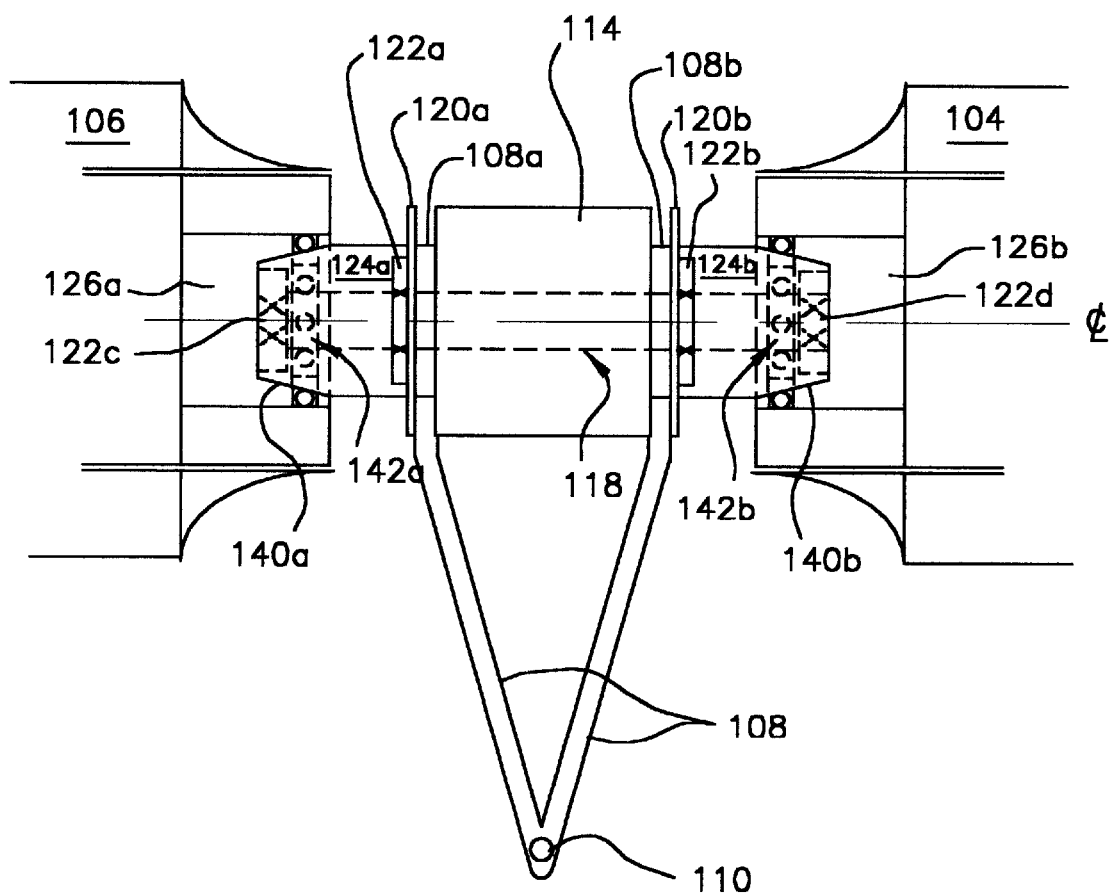
FIG. 4(c) is a top view that illustrates male couplings having tapered ends, in accordance with another embodiment of the invention.

FIG. 4(c) is another top view that illustrates, according to another embodiment of the present invention, the connection of the wheel assembly and axle 118 to outer and inner frame members 104 and 106. In this embodiment, disposed on opposite sides of each wheel are male couplings 124a and 124b, which have tapered outer ends 140a and 140b, respectively. As the wheel pivots around pivot connection 110, male couplings 124a and 124b travel laterally in a curved path and engage female couplings 126a and 126b disposed in inner frame member 104 and outer frame member 106, respectively. Preferably, the tapered ends of male couplings 124a and 124b, when fully inserted into female couplings 126a and 126b respectively, do not contact the inner end surface of female couplings 126 and 126b. As previously discussed, in one embodiment, ball bearings 142a and 142b are disposed between male couplings 124a and 124b and female couplings 126a and 126b, so as to provide support and to reduce the friction between the couplings.

Figure 5:
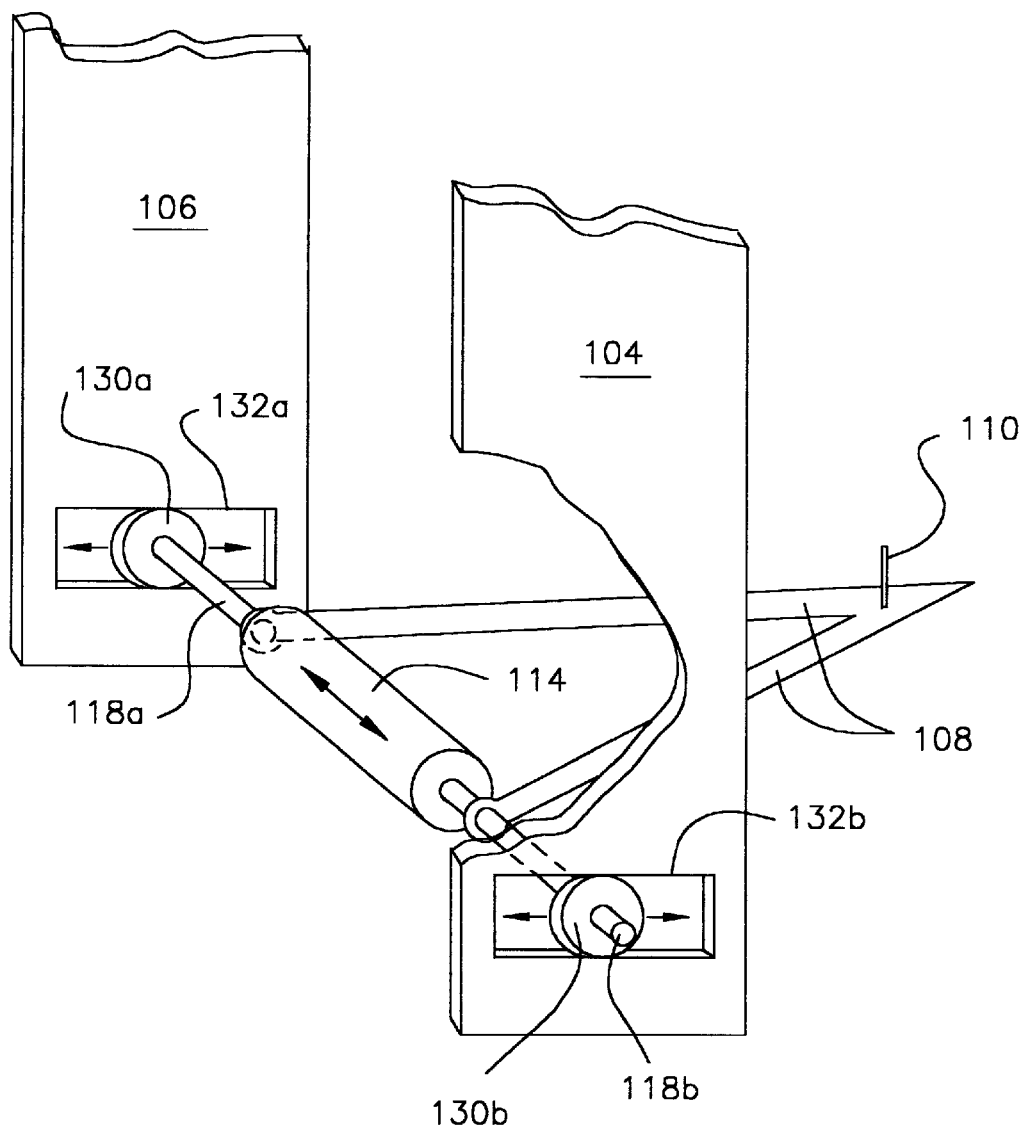
FIG. 5 illustrates the connection of the ends of the axle and the outer and inner frame member, in accordance with another embodiment of the present invention.
Figure 6:
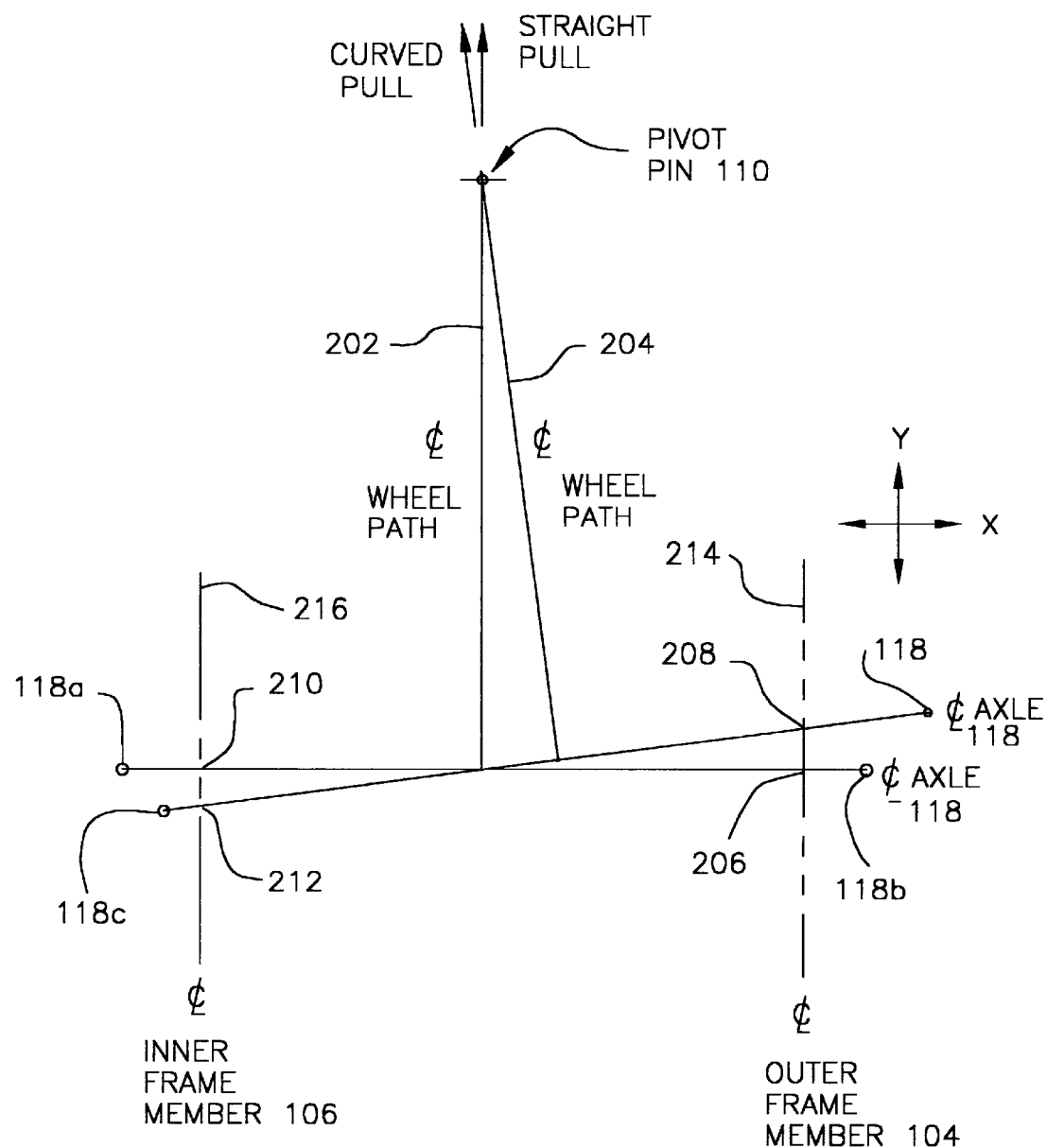
FIG. 6 is a schematic that illustrates the displacement of the various components when the wheel pivots around the pivot connection, in accordance with the embodiment shown in FIG. 5 embodiment of the invention (Prior Art)

FIG. 5 illustrates, in accordance with another embodiment of the invention, the connection of the ends of axle 118 and outer frame member 104 and inner frame member 106. As shown, ends 118a and 118b of axle 118 are inserted through ball joints 130a and 130b, respectively. A ball joint is a swivellable connection, which, in the embodiment shown, permits the ends of axle 118 to be swivelled. According to one embodiment, ball joints 130a and 130b permit the ends of axle 118 to be swivelled into a position that is not perpendicular to the centerlines of the frame members, as shown in FIG. 6 which is discussed further below.

In addition, ball joints 130a and 130b are disposed in horizontal tracks 132a and 132b, that are integral with outer and inner frame members 104 and 106. Thus, end 118a of axle 118 is horizontally slidably secured, via ball joint 130a and track 132a to outer frame member 104, so as to move horizontally in a direction that depends on the direction in which the sulky is being pulled. Likewise, end 118b of axle 118 is inserted through ball joint 130b, and is horizontally slidably secured, via ball joint 130b and track 132b, to inner frame member 106 so as to also move horizontally in a direction that depends on the direction in which the sulky is being pulled, but which is typically opposite to the direction that end 118a moves simultaneously in track 132a. This is shown in more detail in FIG. 6.

In a preferred embodiment, ball joints 130a and 130b also permit axle 118 to move axially relative to outer and inner frame members 104 and 106. Thus, in one embodiment, ends 118a and 118b are not fixedly connected to the ball joints but instead penetrate a hole disposed through the ball joints, as shown in FIG. 5. For instance, when a lateral force is exerted on the wheels, axle end 118a is inserted through a hole in ball joint 130a, while axle end 118b is withdrawn from a hole in ball joint 130b. Likewise, when an opposite lateral force is exerted on the wheels, axle end 118b is inserted through the hole in ball joint 130b, while axle end 118a is withdrawn from the hole in ball joint 130a. This is also shown in more detail in FIG. 6.

During operation, when a sideways displacement force is exerted at the wheels, such as when the horse moves laterally or when the sulky is pulled through a curved section of the racetrack, each pivotable fork assembly 108 pivots around pivot connection 110 and causes wheels 112 to be moved laterally. For instance, if the sulky is pulled in a direction that is one degree off of straight ahead, then pivotable fork assembly 108 will pivot around pivot connection 110 by one degree. In the embodiments shown in FIGS. 4 and 5, the center line of the path of wheel 112 is also pivoted by one degree relative to pivot connection 110. This is illustrated in FIG. 6, which is explained below.

FIG. 6 is a top view line drawing schematic that demonstrates, according to the embodiment of the invention shown in FIG. 5, the displacement of the various components when wheel 112 pivots around pivot connection 110. As previously mentioned, the pivoting of the wheel around pivot connection 110 may be caused by alternating sideway displacement forces produced by the alternating gait of the horse, by the sulky following the path of a horse around the curved sections of the racetrack, or by any other force which acts laterally upon the wheels.

Line 202 is the centerline of the path travelled by wheel 112 in a first position that corresponds to a sulky (such as a sulky of the prior art or in accordance with the present invention) being pulled straight ahead. As shown, in this position, centerline 202 is parallel to centerlines 214 and 216 of outer frame member 104 and inner frame member 106, respectively. Also in this position, the axis of rotation of axle 118 is perpendicular to centerlines 214 and 216 of outer frame member 104 and inner frame member 106. Thus, in this position, the amount of frictional and torsional forces experienced by the wheel as it rotates around its hub are minimal.

Line 204 is the centerline of the path travelled by wheel 112 in a second position that corresponds to the sulky of the present invention being pulled in a direction that is not straight ahead. As shown, in this position, centerline 204 is not parallel to centerlines 214 and 216 of outer frame member 104 and inner frame member 106, but is instead disposed in the same direction as the pulling force. The wheel is able to travel along centerline 204 because it is attached to pivotable fork assembly 108 that pivots about pivot connection 110. Thus, friction between the wheels and the surface of the racetrack due to cocking of the plane of rotation of the wheel relative to the direction of motion of the wheel along the surface, which would typically be experienced in the fixed-wheel sulky of the prior art, is not experienced.

When the sulky of the present invention is pulled in a direction that is not straight ahead, axle 118 is displaced so as to be non-perpendicular to centerlines 214 and 216 of outer and inner frame members 104 and 106. Specifically, axle 118 moves in two directions on a horizontal plane relative to the frame members when a lateral force is applied. First, in the example shown, axle 118 moves to the right on an x-axis. This can be seen by noting that end 118c, which represents one end of axle 118 when wheel 112 is pivoted around pivot connection 110, is displaced to the right relative to end 118a, which represents the same end of the axle when wheel 112 is positioned straight ahead. The same rightward displacement of the other end of the axle is shown via ends 118d and 118b. Thus, in the embodiment shown in FIG. 5, axle 118 is axially slidable relative to the frame members.

A displacement in the y-axis is also experienced by axle 118 when a lateral force is applied. Point 206 is the point of intersection of the axis of rotation of axle 118 and centerline 214 of outer frame member 104 when wheel 112 is positioned straight ahead. When wheel 112 is pivoted around pivot connection 110, the point of intersection of the axis of rotation of axle 118 and centerline 206 of outer frame member 104 is displaced in one direction on the y-axis to point 208. On the other hand, point 210 is the point of intersection of the axis of rotation of axle 118 and centerline 216 of inner frame member 106 when wheel 112 is positioned straight ahead. When wheel 112 is pivoted around pivot connection 110, the point of intersection of the axis of rotation of axle 118 and centerline 216 of inner frame member 106 is displaced to point 212, in a direction on the y-axis which is opposite to the direction of the displacement at outer frame member 104. Thus, in the embodiment as shown in FIG. 5, axle 118 is also horizontally slidable relative to the frame members.

In the pivoted position, although the axis of rotation of axle 118 is not perpendicular to centerlines 214 and 216 of outer frame member 104 and inner frame member 106, the axis of rotation of axle 118 is perpendicular to the centerline of the path travelled by the wheel. Thus, while in the prior art, a wheel that was fixedly mounted to the axle would experience undesirable frictional and torsional forces between the wheel and axis when it experienced a sideways displacement force, the pivotable wheel of the present invention does not experience such frictional and torsional forces. By substantially eliminating these forces, the sulky of the present invention moves more quickly, is less susceptible to tipping, and suffers from less wear and tear.

The sulky of the present invention permits wheel 112 to be pivoted around pivot connection 110 in a relatively small pivot range, thus decreasing the likelihood of tipping. The actual pivot range which is provided by the present invention depends on the distance between outer frame member 104 and inner frame member 106, and on the distance along shafts 116 from upper support 103 to pivot connection 110.

Another advantage afforded by the sulky of the present invention, is that the pivoting features of the wheels remain optimal even if the frame of the sulky is improperly adjusted to the height of the horse. In U.S. Pat. No. 4,817,975, the wheels pivot around rod 18, which was disposed within vertical tube 20. If the frame is improperly adjusted to the height of the horse, vertical tube 20 is not vertical, and undesirable forces are exerted on the wheels and on the horse, thus reducing the performance. In the present invention, these forces are not present even if the frame is improperly adjusted to the height of the horse.

Figure 1:
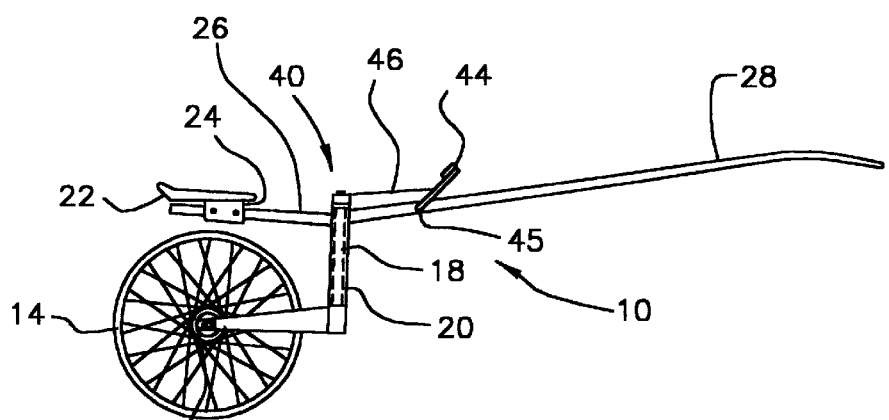
FIGS. 1 and 2 illustrate a sulky of the prior art.
Figure 2:
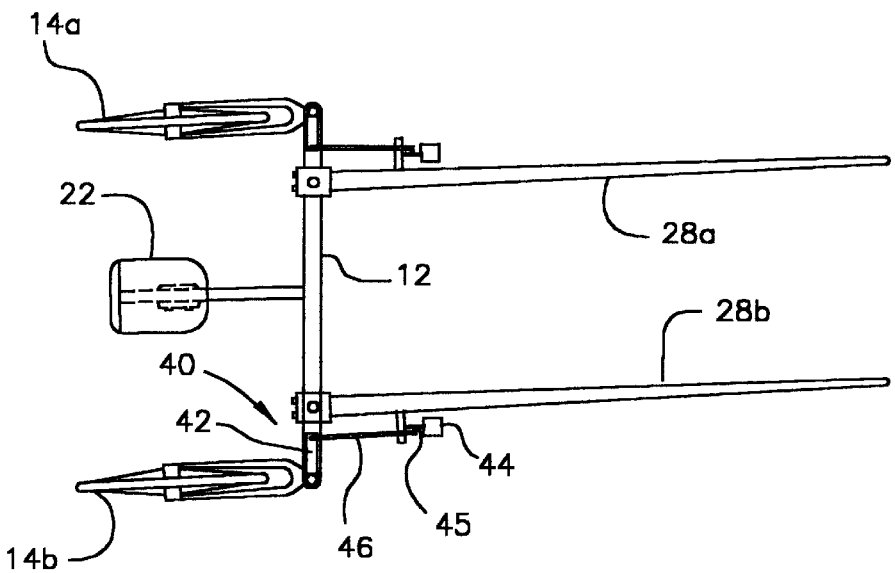
Figure 7:
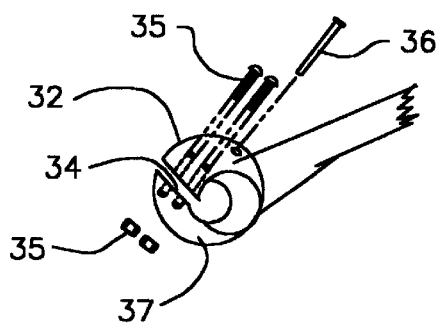
FIG. 7 is an isometric view of a adjustable collar for attaching the shafts to the upper support, in accordance with one embodiment of the invention (Prior Art).

As previously mentioned, FIG. 7 is an isometric view of adjustable collar 32 for adjustably attaching the shafts to the upper support, in accordance with one embodiment of the invention. The adjustable attachment of shafts 116 to upper support 103 is preferred so as to accommodate horses of varying heights and girths, although the invention is not limited in scope in this regard. Collar 32 comprises a compression joint 34 which is secured to upper support 103 by tightening bolts 35. When bolts 35 are not tightened, compression joint 34 slides along upper support 103 and can therefore be moved to a position along the width of upper support 103 which is best suited for a horse of a particular width prior to tightening. Similarly, when bolts 35 are not tightened, compression joint 34 rotates around upper support 103 and can therefore be rotated to an angular position which is best suited for a horse of a particular height prior to tightening. For additional security, a locking pin 36 may be inserted through openings 37 in joint 34 and upper support 103.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

What is claimed is:

1. A sulky comprising:

an upper support having a seat attached thereto via a seat support member, said upper support further having at each end an outer frame member and an inner frame member;

a pair of axles, each said axle disposed between one of said outer and said inner frame members;

a pair of wheels, each said wheel rotatably mounted onto one of said axles;

a pair of shafts for harnessing said sulky to a horse, each of said pair of shafts having a pivot connection about a substantially vertical axis along its length; and a pair of fork assemblies, each of said fork assemblies having a pair of forks which are joined at one end that is pivotably secured to said pivot connection along one of said shafts, and which are rotatably connected at another end to one of said axles on opposite sides of said wheel, wherein said wheels are configured to pivot around said pivot connection upon the exertion of a sideways displacement force at said wheels.

2. The apparatus according to claim 1, further comprising a pair of male couplings disposed on opposite sides of said wheel and a pair of female couplings disposed in each said inner and outer frame member, said male couplings configured and sized to travel axially within said female couplings so as to permit lateral movement of said wheel mounted on said axle.

3. The apparatus according to claim 2, wherein said pair of male couplings and said pair of female couplings each have corresponding radii of curvature.

4. The apparatus according to claim 3, wherein said radii of curvature of each of said pair of male couplings and said pair of female couplings corresponds to a radial distance between said center of said wheel and said pivot connection.

5. The apparatus according to claim 4, wherein said radii of curvature of each of said pair of male couplings and said pair of female couplings, and said radial distance between said center of said wheel and said pivot connection, are approximately 36 inches.

6. The apparatus according to claim 2, wherein each of said pair of male couplings has a tapered end.

7. The apparatus according to claim 2, further comprising at least one ball bearing disposed between said male couplings and said female couplings.

8. The apparatus according to claim 1, wherein each of said pair of axles is horizontally slidably secured to said outer and inner frame members.

9. The apparatus according to claim 8, wherein each of said pair of axles is axially slidably secured to said outer and inner frame members.

10. The apparatus according to claim 9, wherein each of said pair of axles is secured to said outer and inner frame members via a ball joint.

11. The apparatus according to claim 10, wherein said ball joints are mounted on a track disposed in said outer and inner frame members.

12. The apparatus according to claim 11, wherein said lateral movement corresponds to said fork assemblies pivoting at said pivot connection.

13. The apparatus according to claim 1, further comprising an adjustable collar for adjustably attaching said shafts to s aid upper support.

* * * * *